United States Patent
Tsirigotis et al.

(10) Patent No.: US 6,883,068 B2
(45) Date of Patent: Apr. 19, 2005

(54) METHODS AND APPARATUS FOR IMPLEMENTING A CHCHE REPLACEMENT SCHEME

(75) Inventors: Panagiotis Tsirigotis, Mountain View, CA (US); Rajeev Chawla, Union City, CA (US); Sanjay R. Radia, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 635 days.

(21) Appl. No.: 10/016,123

(22) Filed: Dec. 17, 2001

(65) Prior Publication Data

US 2003/0115420 A1 Jun. 19, 2003

(51) Int. Cl.⁷ .................... G06F 12/00; G06F 15/167
(52) U.S. Cl. .................. 711/133; 711/134; 709/213; 709/216
(58) Field of Search .................. 711/133, 134; 709/213, 216

(56) References Cited

U.S. PATENT DOCUMENTS

| 6,098,096 | A | * | 8/2000 | Tsirigotis et al. | 709/213 |
|---|---|---|---|---|---|
| 6,598,119 | B1 | * | 7/2003 | Becker et al. | 711/119 |
| 6,754,800 | B1 | * | 6/2004 | Wong et al. | 711/216 |
| 2002/0016911 | A1 | * | 2/2002 | Chawla et al. | 713/153 |
| 2002/0184441 | A1 | * | 12/2002 | Wong et al. | 711/113 |
| 2003/0093645 | A1 | * | 5/2003 | Wong et al. | 711/216 |
| 2004/0111443 | A1 | * | 6/2004 | Wong et al. | 707/202 |

* cited by examiner

Primary Examiner—Jack A. Lane
(74) Attorney, Agent, or Firm—Finnegan, Henderson, Farabow, Garrett & Dunner, L.L.P.

(57) ABSTRACT

Methods and systems are provided for processing a cache. A candidate object is identified for updating. A fresh object corresponding to the candidate object is obtained if it is determined that a newer version of the candidate object is available. A destination buffer is selected from a group of primary and non-primary buffers based on an amount of available space in a primary buffer. The fresh object is stored in the destination buffer.

26 Claims, 7 Drawing Sheets

| WEB OBJECT URL | EXPIRE DATE |
|---|---|
| HTTP://www.xyz.com | 6-14-99 |
| HTTP://www.lmn.com | 6-14-99 |
| HTTP://www.stu.com | 6-14-99 |
| HTTP://www.def.com | 6-14-99 |
| HTTP://www.zzz.com/fgh | 6-15-99 |
| HTTP://www.pqr.com | 6-15-99 |
| HTTP://www.mmm.com | 6-15-99 |
| HTTP://www.ijk.com | 6-16-99 |
| HTTP://www.bbb.com | 6-16-99 |
| HTTP://www.uvw.com | 6-16-99 |
| HTTP://www.bbb.com/here | 6-17-99 |
| HTTP://www.eee.com/123 | 6-17-99 |
| HTTP://www.rrr.com | 6-17-99 |

HASH ENTRY          511

| OBJECT ID | SIZE | BUFFER ID | INDEX |
|---|---|---|---|
| 600 | 610 | 620 | 630 |

Fig. 6

METHODS AND APPARATUS FOR IMPLEMENTING A CHCHE REPLACEMENT SCHEME

FIELD OF THE INVENTION

The present invention relates generally to caching objects, and in particular to apparatus and methods for updating cached objects.

BACKGROUND OF THE INVENTION

The Internet is a global network of inter-connected computer systems that is widely used to provide and to access information. A web server is an example of an Internet-connected computer system that can provide information to Internet-connected client computers. Provided information may be accessed in units called web objects. Web clients connect to web servers and access web objects. A primary web server from which a web object originates may be called an origin server. An arbitrary piece of information may be called an object.

As Internet access becomes more popular, less expensive and faster, and as the number of clients increases, so does the number of connections made to particular origin servers. This increased number of connections can increase both network load and server load, sometimes causing parts of the Internet and particular origin servers to become so overloaded that they become inaccessible.

Cache systems can be used to reduce both network load and origin server load by migrating copies of popular objects from origin servers to cache servers. The cache servers may reside on a network, in locations close to particular clients.

A protocol defines how a client and an origin server communicate. The Internet, for example, uses protocols such as the Hypertext Transfer Protocol ("HTTP") to transfer information. In HTTP, a client sends a service request message to an origin server. For example, a service request message might include a request for a method to be performed on an object in the origin server. The object may be identified in the service request message by a uniform resource locator ("URL"), which is an identifier of the object. An origin server ordinarily responds to a service request message by performing the method corresponding to the request. The request may be a retrieve operation, which causes the origin server to retrieve the object identified by the URL, and transmit it to the requesting client.

Various means for caching data may be used in computer systems to reduce system loads by storing copies of frequently accessed information in places closer to where the information is likely to be needed. In response to a request from an information requester, a conventional cache system determines whether the requested information is cached. When the cache system determines requested information is not cached, the cache system may then request and receive corresponding information from an appropriate information provider. If, on the other hand, the information is already in the cache, it is not necessary for the caching system to obtain the requested information from an origin server. In either case, the requested information is then provided to the requester. By thus reducing loads and locating data closer to where it is needed, caching systems make data access more efficient.

Additionally, conventional cache systems can improve the speed of information transfer between an information requester and an information provider. Conventional cache systems generally include a high speed memory that stores information requested from an information provider. A cache may be used in networks to expedite transferring information between a client, the information requester, and an origin server, the information provider.

However, systems and methods are needed that provide a reliable cache system that can provide for cache replacement without interfering with normal operation of a cache. Embodiments consistent with the present invention satisfy this need.

SUMMARY OF THE INVENTION

In accordance with embodiments consistent with the present invention, methods and systems are disclosed for processing a cache. First, fresh objects are obtained corresponding to objects that are candidates for updating, if corresponding fresh objects are available. Next, a destination buffer is identified from a pool of primary and non-primary buffers, based on an amount of available space in a primary buffer. Finally, the fresh object is stored in the destination buffer.

Additional benefits of the invention will be set forth in part in the description which follows, and in part will be obvious from the description, or may be learned by practice of the invention. The benefits of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

FIG. 4 is a diagram illustrating an exemplary table of objects that are identified by a URL and that have an associated expiration date consistent with an embodiment of the present invention;

FIG. 6 is a block diagram illustrating an exemplary hash table entry consistent with an embodiment of the present invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts.

In one embodiment consistent with the present invention, information that is potentially out-of-date is updated with up-to-date information by storing the up-to-date information in a location that is alternate to a primary location in which information is stored. Accordingly, the primary information is not overwritten unless the updated information is requested.

Figure 1A:
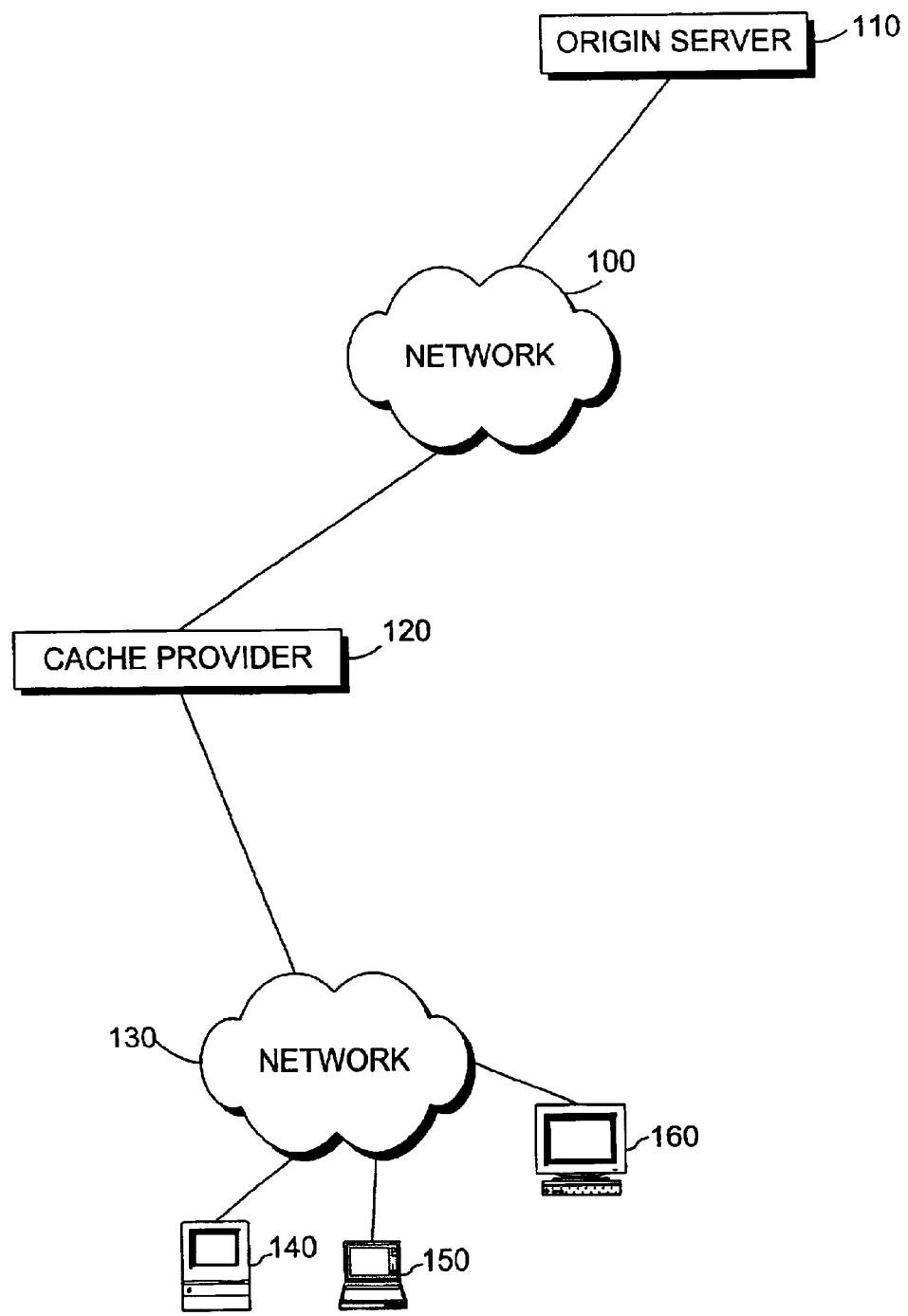
FIG. 1A is a block diagram of an exemplary system in which an embodiment of the present invention may be practiced.

FIG. 1A is a block diagram of an exemplary system in which an embodiment consistent with the present invention may be practiced. Clients 140, 150, and 160 are connected to network 130. Cache provider 120, which may be connected between network 130 and network 100, handles service requests from clients 140, 150, and 160. In one embodiment, cache provider 120 may be a caching proxy web server. In another embodiment cache provider 120 may be a caching file server. In yet another embodiment, cache provider 120 may be a caching system that is implemented on a computer having client software, such as for example, in the case of a client side caching application.

In response to a service request for information from a client, such as client 140, cache provider 120 may either return information from its local cache, or retrieve information from origin server 110, forwarding the information to client 140. If the information is not already in the local cache, the information is retrieved from origin server 110 and cache provider 120 then caches the information locally for later use. This is called a cache miss. Caching information allows cache provider 120 to quickly provide information to a client at a later time if corresponding information is requested again. When particular information is found in local cache and directly provided to a requesting client, it is called a cache hit.

Figure 1B:
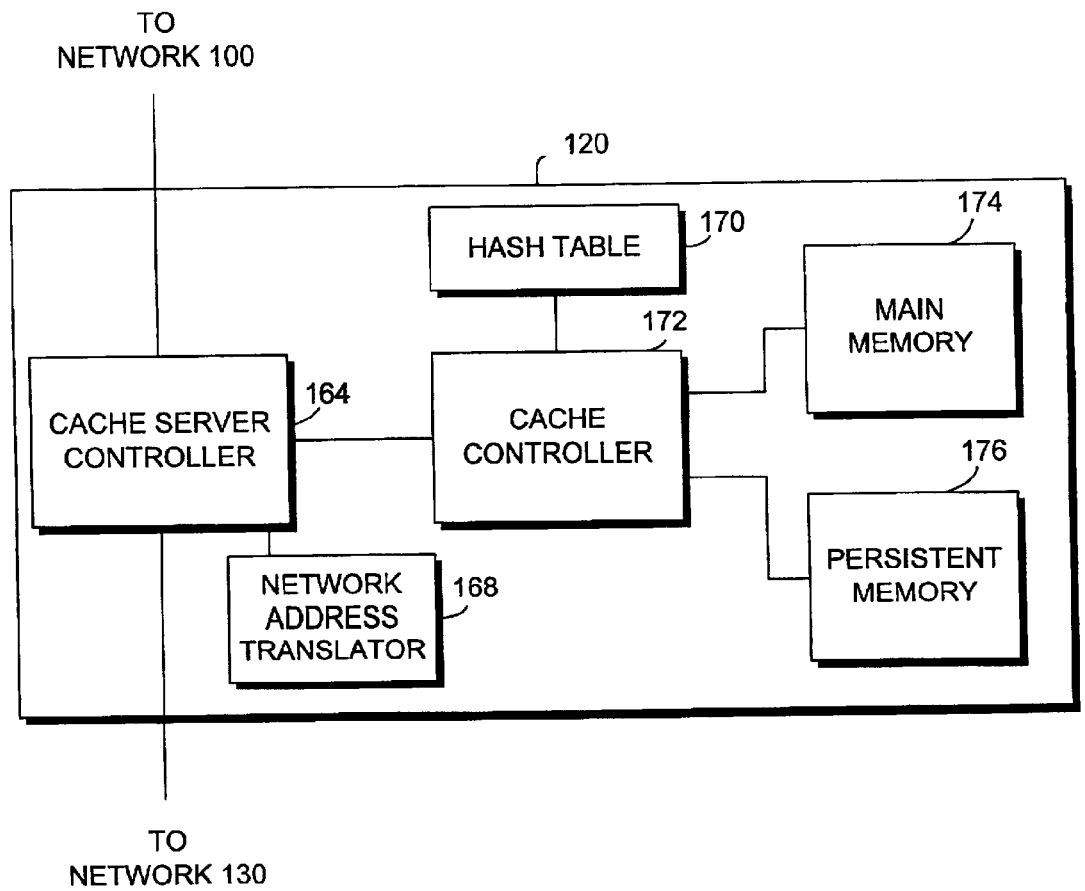
FIG. 1B is a block diagram of an exemplary cache system consistent with an embodiment of the present invention.

FIG. 1B is a block diagram of an exemplary cache system consistent with an embodiment of the present invention. Cache provider 120 has a cache server controller 164, which is involved with controlling operations of cache provider 120. Cache server controller 164 is connected to networks 100 and 130. In one embodiment consistent with the present invention, cache controller 172 includes a memory management controller (not shown) that is capable of managing information stored in various memories associated with a computer system. In one embodiment consistent with the present invention, a memory management controller comprises a general purpose computer processor, such as those commercially available from Intel™ Corporation or Sun™ Microsystems, Inc. that is programmed to manage information stored a memory associated with the processor.

In another embodiment, cache server controller 164 includes a network interface controller (not shown), which controls a connection to a network by controlling the reception and transmission of information on a network. In yet another embodiment, cache controller 172 is associated with a network listener (not shown) which receives information from a network interface and performs an appropriate action based on content of the received information. In yet another embodiment, cache controller 172 is associated with a network service (not shown) which processes information related to information being sent and received on a network interface.

Cache provider 120 also has a cache controller 172, which is logically coupled with main memory 174. In one embodiment, main memory 174 lacks persistence characteristics associated with persistent memory 176 and provides faster read and/or write performance than persistent memory 176. In one embodiment, fast main memory 174 is RAM. Cache controller 172 is also logically coupled with a hash table 170. In one embodiment, both main memory 174 and hash table 170 reside in RAM of a computer system. Hash table 170 contains hash entries as further described in connection with FIG. 6. Cache controller 172 determines whether an object is stored in persistent memory 176 or in main memory 174 by referencing hash table 170. For example, in response to a request for a particular web object, cache controller 172 looks up the web object in hash table 170.

Persistent memory 176 is memory, the contents of which remain valid even in situations where normal main memory, such as, for example, main memory 174 would not retain its memory contents, such as when power is disconnected from the memory. Persistent memory 176 could be implemented, for example, using disk drives or other non-volatile memory devices. In one embodiment, persistent memory 176 comprises a plurality of disks drives. In the embodiment, objects stored in persistent memory 176 have an index corresponding to a stored object.

The cache system of FIG. 1B may be used to implement a persistent cache including metadata. Metadata is generally data about data, and, in connection with embodiments consistent with the present invention, metadata contains information about how data is stored and formatted within persistent memory 176 or other memory associated with the cache system. Metadata may be stored at the same location on each disk or it may be stored in different locations. In one embodiment, metadata may include information for accessing indexes corresponding to buffers within the persistent storage. Metadata may also include a timestamp, a start of index pointer, an index area size indicator, an index pointer, a start of data pointer, a data area size indicator and a data pointer.

One type of a caching system, such as the system of FIG. 1B, is a proxy cache used to facilitate caching of information between a client and an origin server. In one embodiment consistent with the present invention, when a client requests information associated with an origin server, the client does not contact the origin server directly, but instead contacts a proxy cache that provides the requested information to the client.

Requested information may be in the form of an object, which may be identified by an associated URL. Since cached information reflects a static represntation of information as it existed in connection with an origin provider, such as, for example an origin server, at the time the information was received by the caching system, the cached information can become out of synch with current information associated with the origin provider. Accordingly, cached information, such as the cached object, is said to be valid if its contents are the same as the current copy associated with an origin server and stale if the cached object's contents are different from the current copy associated with the origin server.

Ideally, a caching system only returns valid information to requesters. However, determining whether cached information is valid or stale requires a caching system to either communicate directly or indirectly with an origin provider over a network or to access information regarding object validity from another source, where the other source must communicate directly or indirectly with the origin provider. In either case, it is necessary for something to communicate with an origin provider, thereby at least partially reducing efficiencies introduced by caching. These efficiencies include, but are not limited to, reducing latency, saving network bandwidth, and reducing origin server load. Additionally, many origin providers do not have a capability to directly inform caching systems to discard stale information when the information associated with an origin provider has changed. Thus a practical consequence of caching is that requesters may occasionally receive stale information. Nevertheless, this shortcoming is considered a reasonable tradeoff because of the benefits of caching.

While one embodiment consistent with the present invention uses the example of a cached object, one of ordinary skill in the art will appreciate that the principles of the present invention contemplate that the cached or stored information may be in any format. In one embodiment, a unit of information, such as a group of bits that is regarded as distinct entity in a larger group of bits is cached. In this embodiment, information units that are targeted to be selected or identified are referred to as target information units.

In a cache system, various memory structures may be employed to store cached information. A memory structure in which a primary copy of cached information is stored may be called a primary buffer. To maximize efficiency in accessing stored information, it may be beneficial to store updated information in a location other than the primary buffer, at least for the reason that cached information may be updated multiple times before it is subsequently requested. If updated information is stored in a non-primary location until it is requested, efficiencies of access to the primary buffer are achieved.

The designation of a storage location as primary and non-primary is essentially arbitrary. Primary and non-primary memory structures may reside in any type or combination of types of memory. A distinction between primary and non-primary memory structures is that a primary memory structure is a structure in which a first instance of cached information is stored on the occurrence of a cache miss. An overflow buffer is a type of non-primary memory structure that is used to store updated copies of information that are stored in a primary memory structure until the updated copy is requested.

Figure 2:
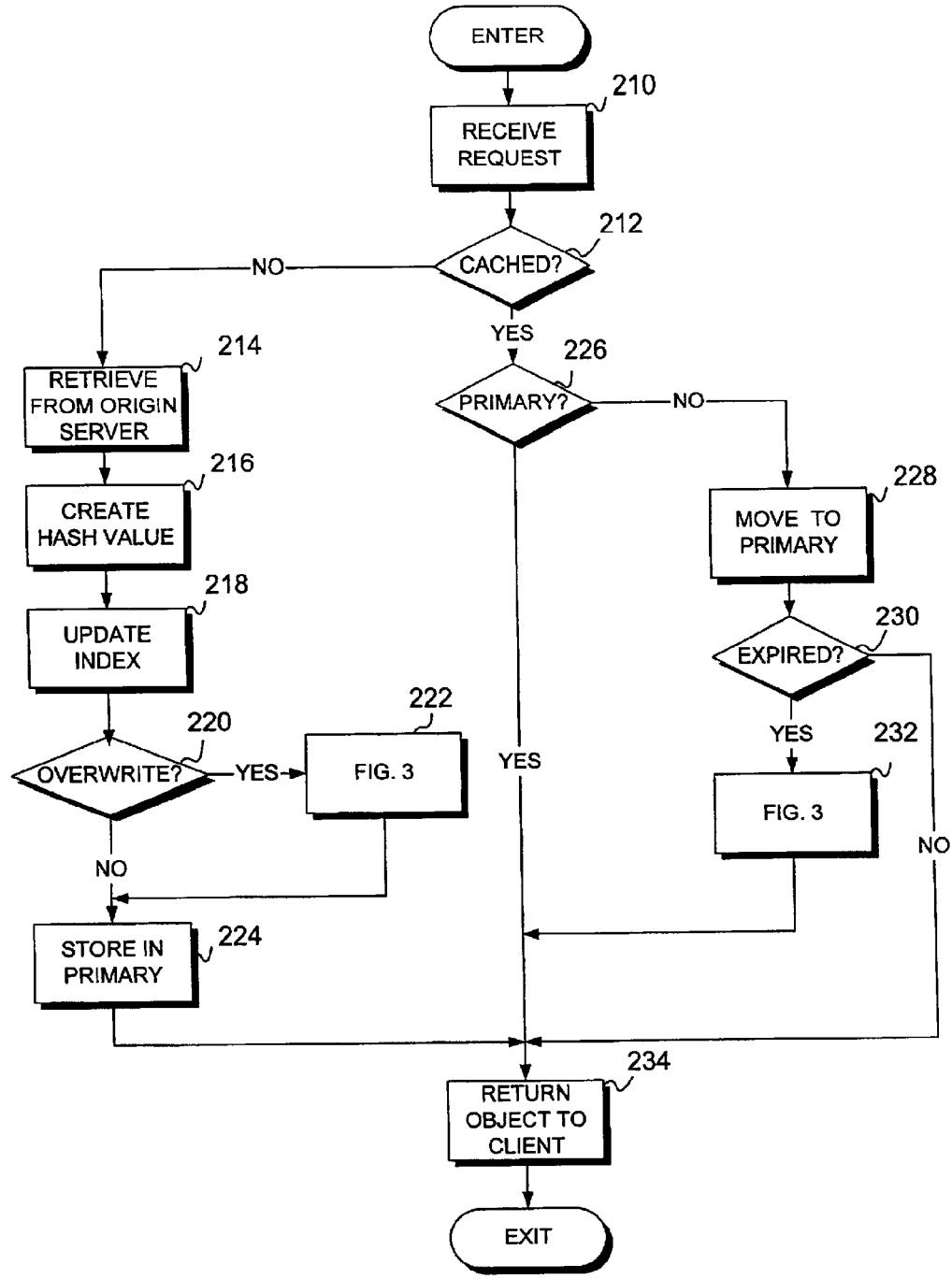
FIG. 2 is a flow diagram illustrating an exemplary method consistent with an embodiment of the present invention.

FIG. 2 is a flow diagram illustrating an exemplary method consistent with an embodiment of the present invention. To begin the method, a request is received (box 210). The request may be received by cache provider 120 or by another request-receiver on a network. In one embodiment, the request is for an object to be provided to a requesting client. Next it is determined whether the requested object is cached (box 212). In one embodiment it is determined whether an object is cached by considering whether the object is stored in local cache. In another embodiment, it is determined whether the requested object is stored in a remote or external cache. If a requested object is cached, then it is determined whether the object is stored in a primary buffer (step 226). In general, a primary buffer is the first location in which an object is cached following a cache miss. In one embodiment, primary buffers are implemented as cyclic buffers that may be stored in persistent memory. In another embodiment, primary buffers may be located in persistent memory and main memory. In yet another embodiment, primary buffers are stored only in main memory.

If the requested object is located in a primary buffer, then the requested object is returned to a requesting client (box 234).

Returning to box 226, if the requested object is not stored in a primary buffer, then the object is stored in a non-primary buffer. In one embodiment, a non-primary buffer is implemented as an overflow buffer. An overflow buffer may be associated with a primary buffer or with another non-primary buffer. Once it is determined that a requested object is located in a non-primary buffer, then the object itself is moved to an associated primary buffer. In the case of an overflow buffer associated with a primary buffer, the requested object is moved from the overflow buffer into the associated primary buffer (box 228).

In one embodiment consistent with the present invention, it is possible to associate expiration information with, for example, a cached object. Expiration information may include a date, a time or a date or time range after which an object should be considered expired. In one embodiment, expiration information is used as a predictor of staleness. For example, if a piece of information is cached as a result of a cache miss and assigned an expiration date of two weeks after being cached, then an assumption may be made that there is an increased likelihood that once a particular object expires, it is stale. It is not necessary to draw a conclusion that an expired object is actually stale. Similarly, it is possible that an object will become stale before it expires. As noted above, cached information is considered stale if an origin provider has a newer version of the information.

In one embodiment, an object may have a predetermined expiration time included in the object. For example, some web pages are transmitted with an associated expiration time to assist caching systems in predicting when an object will become stale. Unfortunately, it is cumbersome to assign an expiration date to an object, and, therefore, many web objects have no assigned expiration date. If a cached object does not have an assigned expiration date, the caching system usually handles the problem that a particular cached object may be stale. In one embodiment, a cached object is assigned a timestamp by a caching system when it is initially cached, and from that time on, the object ages.

To a reasonable approximation, the longer an object has been in a cache, the higher a probability that the object will be stale. In order to reduce the probability that a client will receive a stale object, default expiration dates may be assigned to objects, where the default expiration date is set to some time after the object is cached, such as, for example, two weeks. Default expiration dates may be assigned to those objects that do not have existing expiration dates. During off-peak times a caching system may validate or download new objects corresponding to objects that are about to expire. For example, in one embodiment, rather than generating a list of expired objects, a list is prepared of objects that have expired and those that will expire within some predetermined period. That is to say, in one embodiment, a list of objects that are considered potentially stale is constructed from objects that are expired or are about to expire.

Returning to FIG. 2, next it is determined whether the returned object is expired (box 230). If it is expired, then a method is performed, such as the method illustrated in connection with the flow chart of FIG. 3 (box 232). Finally, the requested object is returned to a requesting client (box 234).

Referring back to box 212, if a requested object is not in cache, then the requested object is retrieved from an origin server (box 214). Next, a corresponding hash value is created or computed (box 216). Using a hash function and corresponding hash table is optional, but use of such techniques may improve time efficiency, for example, in locating objects by way of a look-up table. It will be apparent to a person of ordinary skill in the art to select a hash function that is suited to, for example, object identifier information used to reference, for example, objects.

Next, an index is updated corresponding to the requested object (box 218). Then, it is determined whether adding this object to the primary buffer will result in the overwriting of another object in the primary buffer (box 220). If adding the requested object to the primary buffer will not result in overwriting objects in the primary buffer, then the object is stored in the primary buffer (box 224) and the object is provided to a requesting client (box 234).

Figure 3:
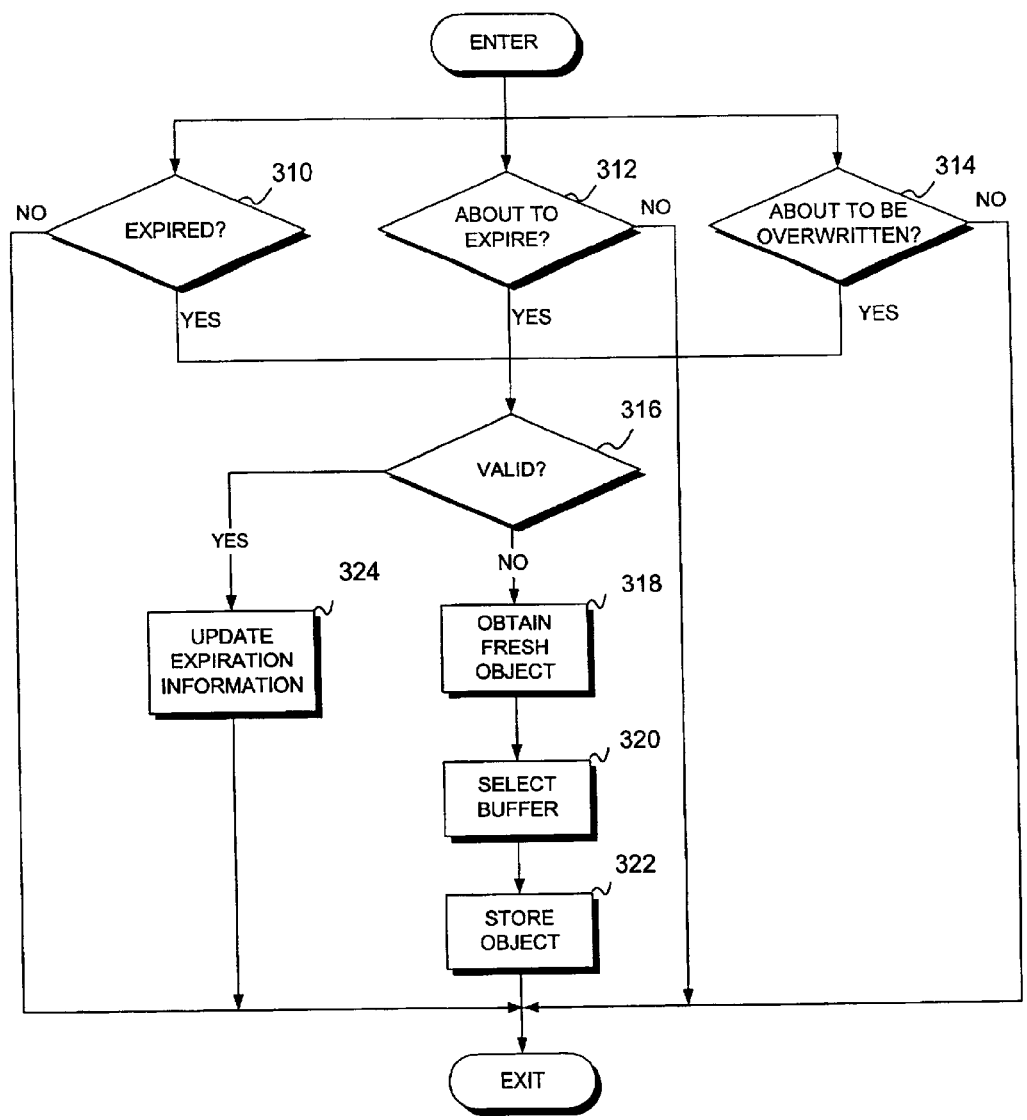
FIG. 3 shows a flow diagram illustrating an exemplary method of updating objects consistent with an embodiment of the present invention.

Returning to box 220, if it is determined that storing the requested object to the primary buffer will result in overwriting of an object in the primary buffer, then a method such as the exemplary method of FIG. 3 is performed (step 222). Next, the requested object is stored in the primary buffer (box 224), and the requested object is provided to the requesting client (box 234).

A cyclic buffer is a data structure in which a beginning and end are logically contiguous. Accordingly, in sequentially writing to a cyclic buffer after the last element of the buffer is written, the next sequential element corresponds to the first sequential element. A person of ordinary skill in the art will appreciate how to use conventional or later improved cyclic buffers in connection with embodiments consistent with the present invention.

When a web object in one of the primary cyclic buffers (i) expires; (ii) is about to expire, or (iii) is about to be overwritten at a wrap-around condition in a cyclic buffer, then the origin server corresponding to the web object is contacted and a new and up-to-date fresh copy of the expired web object is obtained from the origin server. This new copy is then stored in one of the overflow cyclic buffers.

Many web caching systems operate on a 24 hour basis. In order to allow maximum caching throughput during peak hours, a process of replacing expired web objects may be performed during off-peak hours. To facilitate this, a list of objects ordered according to their expiration information may be maintained in the caching system. Expiration information may be a specific date, time, or other period, including a date or time range. Similarly, expiration information may be a temporal range associated with a predetermined event. During off-peak hours, a set of objects may be selected from the list of objects. In one embodiment, a fresh copy of each object in the list is then obtained from a corresponding origin server. If a fresh object is successfully obtained from an origin server, the web object is removed from the ordered list.

When a fresh copy of the object is obtained, it is placed into cache memory. In one embodiment, the fresh copy is placed into an overflow buffer. Next, a hash table entry corresponding to the fresh object is updated to reflect the fact that a fresh copy of the object has been placed into the overflow buffer.

In one embodiment, when there is a cache hit on an object stored in one of the overflow buffers, a copy of the object is copied into one of the primary buffers. Objects in the overflow buffers are allowed to be overwritten by incoming fresh copies of expired objects residing in primary buffers.

If additional persistent storage is available, secondary overflow buffers may be provided for overflow buffers. Similarly, secondary overflow buffers may have associated tertiary overflow buffers. Thus provided a sufficient amount of persistent storage, an embodiment consistent with the present invention allows an object to be kept indefinitely, and fresh copies of objects are obtained at appropriate times, based on loading and other off-peak conditions.

FIG. 3 shows a flow diagram illustrating an exemplary method of updating objects consistent with an embodiment of the present invention. First, it is determined whether a particular object is expired (box 310); is about to expire (box 312); or is about to be overwritten in the cyclic buffer (box 314) because of an event such as, for example, overflowing of a buffer. In one embodiment, optional operations corresponding to boxes 310, 312, and 314 may occur sequentially. In another embodiment the optional operations may occur simultaneously or partially simultaneously. In one embodiment, each of the optional operations is performed. In another embodiment at least one of the optional operations is not performed.

In one embodiment, it may be determined whether an object is expired by making reference to a table corresponding to object identifiers and expiration dates. In other embodiments, expiration dates corresponding to a particular object may be obtained in any number of ways, such as, for example, by querying a local or remote object registry that includes object expiration information. In yet another embodiment, expiration may be related to a timestamp associated with objects, such that an object is considered to be expired if it is older than a predetermined age. If it is determined that none of the above conditions is satisfied, then the process completes. If, however, any of the above conditions is met, then the requested object is optionally validated (box 316). In one embodiment, an object is validated by querying an origin server to determine whether the object has been updated since the last request for the object. An object may also be validated by checking an object registry to determine whether the object has been updated since the last time a fresh copy was obtained from an origin server. If the object is determined to be valid, then the optional step of updating expiration information (box 324) may be performed, and the process completes.

Referring back to box 316, if the requested object is determined not to be valid, a fresh object is obtained that corresponds to the invalid candidate object (box 318). The fresh object may be obtained by separate request from an origin server, or a fresh object may be obtained from a body of a reply message from a validation request to an origin server. A fresh object may be obtained in other ways, such as from an object registry that may maintain updated copies of particular objects. Next, a buffer is selected (box 320), into which the fresh object may be stored. Next, the fresh object is stored in the selected buffer (box 322). In one embodiment, if it is determined that a primary buffer is full, then the fresh object may be stored in an overflow buffer.

FIG. 4 is a diagram illustrating an exemplary table of objects that are identified by a URL and that have an associated expiration date consistent with an embodiment of the present invention. Table 410 contains a list of URLs and associated expiration dates. When an object is initially requested by a client and received from an origin server, an origin server may provide an expiration date in connection with the object. In this embodiment, the provided expiration date is placed in the table. Alternatively, an object may not have an associated expiration date that is provided by an origin server. In one embodiment, if an origin server does not provide an expiration date, a caching provider may assign an expiration date based on characteristics of the object, origin server, requester, or time of request. In another embodiment, a default expiration may be set for some predetermined time period subsequent to an initial retrieval, such as, for example, two weeks.

Figure 5:
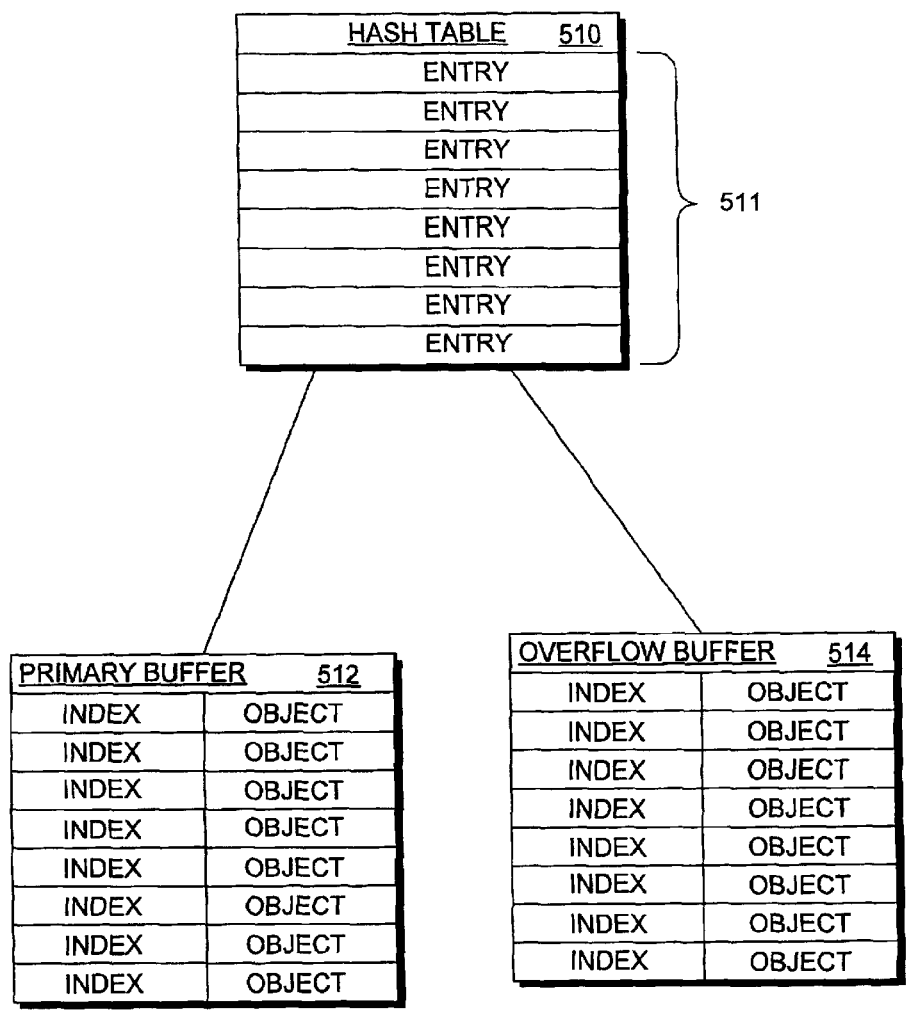
FIG. 5 is a block diagram illustrating an exemplary hash table, an exemplary primary buffer and an exemplary overflow buffer consistent with an embodiment of the present invention.

FIG. 5 is a block diagram illustrating an exemplary hash table, an exemplary primary buffer and an exemplary overflow buffer consistent with an embodiment of the present invention. Hash table 510 contains hash entries 511, such as the hash entry further described in connection with FIG. 6. Entries 511 may include a buffer identifier and an index or other data structure capable of associating a hash entry with an entry in a particular buffer. Depending on an identification in the hash table entry, a particular entry in a hash table may reference a cached object in a primary buffer, such as primary buffer 512, or in an overflow buffer, such as overflow buffer 514.

In an embodiment consistent with the present invention, a cache provider uses persistent cyclic buffers to implement a very large persistent cache with minimal inspect and repair time after a system crash and reboot. Such a caching file system also achieves maximum caching throughput with minimum overhead when creating or deleting objects within the persistent cache.

In another embodiment, a cache provider uses at least one cyclic buffer to store objects, each cyclic buffer residing in persistent storage. Further, a cache provider may use additional cyclic buffers called overflow cyclic buffers to store new copies of expired objects.

In yet another embodiment, available persistent storage in a caching system is divided into sets of buffers, namely primary and overflow buffers. The primary buffers are used to store valid objects. New valid objects are added into the primary buffers. A size of primary buffers may be large enough to accommodate an anticipated size of a large set of requested valid objects without exceeding an allocated size of the primary buffers. A total size of a set of primary buffers may be significantly larger than a corresponding total size of a set of overflow buffers.

FIG. 6 is a block diagram illustrating an exemplary hash table entry consistent with an embodiment of the present invention. In the embodiment, hash table entry 511 comprises an object identifier 600 corresponding to an object, a size 610 corresponding to the object, a buffer identifier 620, and an index 630, corresponding to a position within a buffer. If the object is also stored in main memory, a corresponding hash entry may also reference a memory address (not shown) corresponding to an address in memory where the object is stored.

Since the number of cacheable documents in an arbitrary network may be huge, is advantageous for a caching system to use a large cache to increase the chance of a cache hit. However filling up a large cache with objects may take a long time. It is therefore important to preserve contents of a large cache even in the event of a system shutdown. Thus, caching systems consistent with embodiments of the present invention may store cached objects in large but slow persistent storage. In one embodiment, persistent storage is a disk storage system.

Unfortunately, reading data from or writing data to a disk may be slow. In many cases, it may be significantly slower than access to fast main memory. To further reduce the latency associated with requests for objects, a fast but smaller memory cache is used to store copies of the objects that are deemed most likely to be requested in the near future. It is desirable to use a largest possible amount of persistent memory in order to have the largest number of possible objects to ultimately increase a hit-ratio.

A caching system may conserve network bandwidth, minimize server load, and improve response time for the user. These benefits are achieved by having a high hit-ratio. Increasing a size of a cache may increase a hit ratio. Unfortunately, because of expired web objects, having a large cache may not necessarily lead to conserving network bandwidth and server load. This is because a cache hit of an expired object is equivalent to a cache miss in terms of network usage since an origin server must still be contacted for validation.

For example, if a web cache uses two weeks as a default expiration date for web objects that do not have an expiration date, and a caching system caches a total of 10 G bytes of data in two weeks, then the optimal cache size is 10 G bytes—size of valid web objects. Any cache that is larger than 10 G bytes will only contain more expired web objects and a cache hit on expired web objects will not reduce network bandwidth and server load.

Because of a drop in price and increase in disk capacity, it is now economically feasible for a caching system to have a very large cache that may exceed the optimal cache size of a caching system. It is therefore desirable to be able to fully utilize large cache that exceeds the optimal cache size to increase the hit ratio, thereby reducing network utilization and server load and improving response times for users.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method of refreshing a cache, the cache comprising at least one cached object, the cache including at least one candidate object to be updated, the method comprising:

obtaining a fresh object corresponding to the candidate object when it is determined that a newer version of the candidate object is available;

identifying a destination buffer, chosen from at least one primary buffer and at least one non-primary buffer, in which to store the fresh object based on an amount of available space in the primary buffer; and storing the fresh object in the destination buffer.

2. A method according to claim 1 further comprising:

receiving a request for a requested object;

identifying a source buffer corresponding to the requested object; and moving the requested object from the source buffer to the primary buffer when the source buffer is the non-primary buffer.

3. A method according to claim 1 further comprising:

receiving a request for a requested object, the request originating from a requester;

accessing an entry in a table corresponding to the at least one cached object using a table index, the accessing based on identifying information associated with the requested object;

identifying a source buffer based on buffer identification information from the table;

obtaining the requested object from the source buffer;

updating the primary buffer with the requested object if the source buffer is an overflow type buffer; and transmitting the requested object to the requester.

4. A method according to claim 1, wherein obtaining the fresh object is performed by retrieving the fresh object from an origin server.

5. A method according to claim 4 further comprising:

requesting information from the origin server to determine that the newer version of the candidate object is available.

6. A method according to claim 1 further comprising:
identifying the candidate object based on expiration information associated with the cached object.

7. A method according to claim 6, wherein the primary buffer comprises at least one primary cyclic buffer, wherein the primary cyclic buffer is stored on at least one disk drive; and
wherein the non-primary buffer comprises a cyclic overflow buffer stored on at least one disk drive, wherein the cyclic overflow buffer is configured to receive the fresh object.

8. A method according to claim 1 further comprising:
identifying the candidate object based on a position within the primary buffer.

9. A method for managing a cache, the method comprising:
obtaining current information corresponding to a set of information units by identifying target information units for which updated information is available;
identifying an information destination, chosen from at least one primary destination and at least one non-primary destination, in which to store the updated information based on an amount of available space in the primary destination;
storing the updated information in the information destination;
receiving a request;
identifying a source having requested information corresponding to the request, the source being from a group consisting of a primary storage location and an overflow storage location;
moving the requested information from the source to the primary storage location if the source is the overflow storage location.

10. A method according to claim 9 further comprising transmitting the requested object to a requester after the requested information is moved.

11. A method according to claim 9, wherein obtaining the current information is accomplished by connecting to a server over a data network and requesting the current information from the server.

12. A method of maintaining files in a cache, the method comprising:
obtaining at least one updated file corresponding to at least one of a plurality of expired files within the cache by identifying those of the expired files that have changed on a corresponding origin server;
identifying a file storage means, chosen from at least one primary file storage means and at least one non-primary file storage means, in which to store the updated file based on availability in the primary storage means; and
moving the updated file from the non-primary storage means to the primary storage means upon receiving a request to provide access to the updated file.

13. An apparatus for updating a cache, the apparatus comprising:
a network interface controller operative to receive a fresh object corresponding to a stale object when it is determined that a fresh object is available; and
a memory management controller operative to select a memory segment, chosen from at least one primary segment and at least one overflow segment, in which to store the fresh object based on an amount of available space in the primary segment, wherein the memory management controller is operative to store the fresh object in the selected memory segment.

14. An apparatus according to claim 13, wherein the network interface controller is further operative to request information from an origin server to determine that the fresh object is available.

15. An apparatus according to claim 13 further comprising a processor operative to identify the stale object based on expiration information.

16. An apparatus according to claim 13 further comprising:
a network listener operative to receive a request for an object, wherein the listener is configured to move the requested object into the primary segment, in the case where the requested object was previously stored in the overflow segment.

17. Apparatus according to claim 13 further comprising:
a network service operative to transmit a fresh object over a network, wherein the network service is operative to move the fresh object from the overflow segment to the primary segment.

18. An apparatus for implementing a cache replacement scheme, the apparatus comprising:
means for obtaining a fresh object corresponding to a stale object when it is determined that a fresh object is available;
means for identifying a first storage means from a group comprising a primary storage means and an overflow storage means based on an amount of free space in the primary storage means; and
means for storing the fresh object in the first storage means.

19. An apparatus for updating cache, the apparatus comprising:
means for receiving newer information corresponding to information-containing means by identifying target information-containing means for which the newer information is available;
information-storage means, chosen from at least one of primary-storage means and overflow-storage means for storing the newer information based on an amount of available space in the primary-storage means;
means for storing the updated information in the information-storage means;
means for receiving a request;
means for identifying a source having requested information corresponding to the request; and
means for moving the requested information from the source to the primary-storage means when the source corresponds to the overflow-storage means.

20. A computer-readable medium containing instructions operative to cause a processor to refresh a cache, the computer-readable medium comprising:
program code configured to obtain a fresh object corresponding to a candidate object when it is determined that the candidate object is expired and a newer version of the candidate object is available;
identification program code configured to identify a destination buffer, the destination buffer chosen from at least one primary buffer and at least one overflow buffer, wherein the fresh object is stored in the destination buffer and wherein the identification program code causes the processor to identify the destination buffer based on an amount of available space in the primary buffer.

21. A computer-readable medium according to claim 20 further comprising:

program code configured to receive a request;

program code configured to identify a source buffer corresponding to the request; and program code configured to move the requested object from the source buffer to the primary buffer when the source buffer is the overflow buffer.

22. A computer-readable medium according to claim 20, wherein the program code for obtaining the fresh object includes instructions capable of retrieving the fresh object from an origin server.

23. A computer-readable medium according to claim 20, further comprising:

program code configured to identify the candidate object based on expiration information associated with the object, wherein a table of expiration information is maintained by the processor.

24. A computer-readable medium according to claim 20, further comprising:

program code configured to identify the candidate object based on a location in persistent memory associated with the processor.

25. A computer-readable medium containing instructions operative to implement a cache replacement scheme, the computer-readable medium comprising:

program code for obtaining current information corresponding to a set of information units by identifying target information units for which updated information is available;

program code for identifying an information destination, chosen from at least one primary destination and at least one non-primary destination, in which to store the updated information based on an amount of available space in the primary destination;

program code for storing the updated information in the information destination;

program code for receiving a request; and program code for identifying a source having requested information corresponding to the request, the source chosen from a primary storage location and an overflow storage location.

26. A computer-readable medium containing software associated with a method of maintaining a web cache, the software comprising:

instructions capable of causing a web server to obtain from an origin server at least one updated web page corresponding to at least one stale web page;

instructions capable of causing the web server to store the updated web page in an overflow cyclic buffer associated with a primary cyclic buffer; and instructions capable of causing the web server to move the updated web page from the overflow cyclic buffer to the primary cyclic buffer upon receiving a request to download a requested web page having a URL associated with the updated web page.

* * * * *

UNITED STATES PATENT AND TRADEMARK OFFICE
CERTIFICATE OF CORRECTION

PATENT NO. : 6,883,068 B2  
APPLICATION NO. : 10/016123  
DATED : April 19, 2005  
INVENTOR(S) : Panagiotis Tsirigotis et al.

Page 1 of 1

It is certified that error appears in the above-identified patent and that said Letters Patent is hereby corrected as shown below:

On the title page, Item (54), and Col. 1, Line 2 in the title, line 2, "CHCHE" should read --CACHE--.

Signed and Sealed this

Twenty-second Day of January, 2008

JON W. DUDAS  
*Director of the United States Patent and Trademark Office*